United States Patent [19]
Flake

[11] Patent Number: 5,553,146
[45] Date of Patent: Sep. 3, 1996

[54] METHOD FOR EXCHANGING INFORMATION BETWEEN ISDN TERMINAL EQUIPMENT, THAT IS, DATA TERMINALS, TERMINALS, OR TELECOMMUNICATION SYSTEMS

[75] Inventor: Horst Flake, Oberhaching, Germany

[73] Assignee: Siemens Aktiengesellschaft, Munich, Germany

[21] Appl. No.: 291,104

[22] Filed: Aug. 16, 1994

[30] Foreign Application Priority Data

Aug. 16, 1993 [DE] Germany .................... 43 27 538.9

[51] Int. Cl.⁶ .................... H04L 9/12; H04L 9/00
[52] U.S. Cl. .................... 380/48; 380/9; 380/49
[58] Field of Search .................... 380/9, 28, 48, 380/49, 21

[56] References Cited

U.S. PATENT DOCUMENTS

| | | | |
|---|---|---|---|
| 4,802,220 | 1/1989 | Marker, Jr. | 380/49 X |
| 5,216,715 | 6/1993 | Markwitz | 380/21 |
| 5,245,656 | 9/1993 | Loeb et al. | 380/9 X |
| 5,280,529 | 1/1994 | Nost | 380/49 |

*Primary Examiner*—Bernarr E. Gregory
*Attorney, Agent, or Firm*—Hill, Steadman & Simpson

[57] ABSTRACT

When information is to be exchanged in encrypted or unencrypted form on a per call basis between ISDN terminal equipment (15, 16; 20, 21), that is, data terminals, terminals or telecommunications systems, under the condition that the ISDN basic call procedures are available at the interfaces but supplementary services are not yet available everywhere, then, following a phase produced during the course of the call setup wherein the network (14) has already setup a connection between the calling and the called cryptographic equipment, the cryptographic equipment instead of the network control the further course of the call setup. The B-channel connection that already exists is employed for the mutual control, that is, the D-channel procedures at the ISDN terminal equipment interfaces are imaged onto B-channel procedures at the network interfaces upon employment of an expedient in-band coordination. The method can be employed in conjunction with the utilization of cryptographic equipment in ISDN.

14 Claims, 2 Drawing Sheets

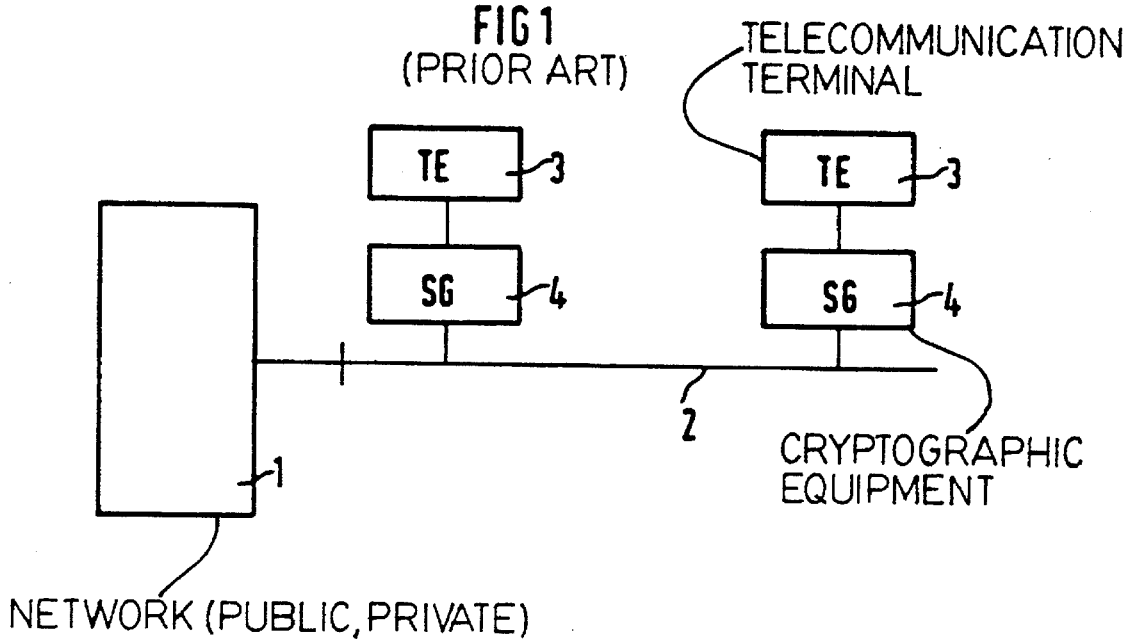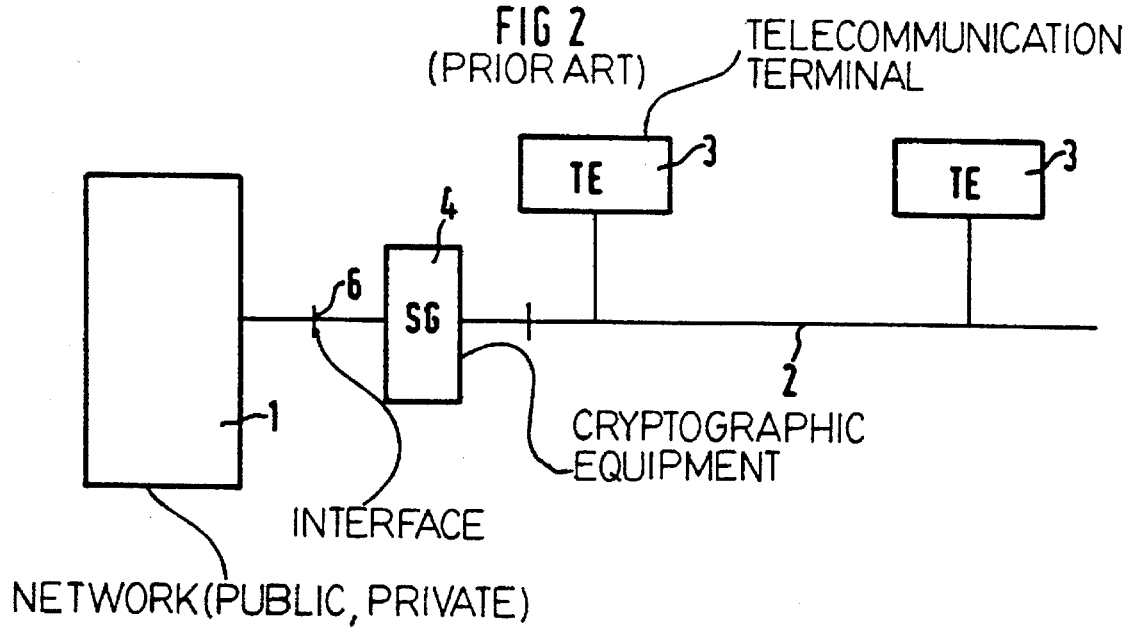

ND FOR EXCHANGING
METHOD FOR EXCHANGING INFORMATION BETWEEN ISDN TERMINAL EQUIPMENT, THAT IS, DATA TERMINALS, TERMINALS, OR TELECOMMUNICATION SYSTEMS

BACKGROUND OF THE INVENTION

The present invention is directed to a method for exchanging information on a per call basis in encrypted or unencrypted form between ISDN terminal equipment (data terminals, terminals or telecommunication systems) having ISDN standard interfaces without special functions upon employment of basic call procedures.

When information is to be exchanged encrypted or unencrypted form on a per call basis between ISDN terminal equipment (ISDN means Integrated Services Digital Network), that is, between data terminals, terminals or telecommunication systems having ISDN standard interfaces without special functions, then only the ISDN basic call procedures and/or supplementary services are available at the interfaces for this purpose. These latter supplementary services, however, may not yet be offered by all network operators under certain circumstances, at least in the ISDN introduction phase.

FIGS. 1–3 show various configuration possibilities of an arrangement of cryptographic equipment for ISDN telecommunication terminal equipment. In the example of FIG. 1, a plurality of telecommunication data terminals 3 are each respectively connected via a cryptographic equipment 4 to a public or private network 1 via a $S_o$ bus 2. The cryptographic equipment 4 in this example thus lie at an ISDN terminal equipment that is respectively formed by a telecommunications terminal 3. In the example of FIG. 2, a single cryptographic equipment 4 is connected via a network interface 6 to the public or private network 1 in the $S_o$ bus 2. This cryptographic equipment 4 precedes a plurality of different ISDN terminal equipment in the $S_o$ bus 2, these terminal equipment being formed by telecommunications terminals 3. In the example of FIG. 3, a plurality of cryptographic equipment 10 lie at a plurality of parallel interfaces between a public network 8 and a private network 9 that is a telecommunications system. The interfaces between the cryptographic equipment 10 and the public network 8 or, respectively, the private network 9 are referenced 11 and, respectively, 12. A plurality of bus-controlled ISDN terminal equipment in the form of telecommunications terminals 3 belong to the private network 9. The bus interface that leads from the private network 9 to the individual ISDN terminal equipment 3 is referenced 13. Terminals 5 having interfaces 7 that technologically differ from the bus interfaces 13 can also be connected to the telecommunications systems, that is, to the private network 9, whereby the encoding function in the cryptographic equipment 10 is likewise accessible to these terminals 5.

The network offers the users specific basic functions in what are referred to as bearer services for the communication of the greatest variety of information types, for example voice, data, audio, video. Calling ISDN terminal equipment must therefore signal the desired bearer service given a call setup. Called ISDN terminal equipment check their compatibility therewith given incoming calls. Moreover, ISDN terminal equipment can additionally transmit compatibility information end-to-end dependent on employment and can involve these in the decision for call acceptance.

When the aforementioned types of information are communicated encrypted, then the bearer service "unrestricted digital information" must be employed for preserving the bit integrity, as in the case of a data transmission. The following problems therefore exist for the communication in the configurations shown by way of example in FIGS. 1–3:

a) The calling cryptographic equipment must clearly indicate to the called cryptographic equipment per connection whether an encrypted or unencrypted communication is desired. The ISDN basic call procedures have hitherto not offered a general solution for this problem since, for example given employment of the attribute "unrestricted digital information", there is ambiguity without auxiliary information (encrypted information or unencrypted data).

b) Given encrypted communication, the called cryptographic equipment must reconstruct the compatibility elements for the original type of information for delivering the call to the connected ISDN terminal equipment so that these can handle the call acceptance in conformity with the standards.

Both problems seem resolvable on the basis of the basic call procedures in combination with a few supplementary services such as, for example, preferably the service UUS1 (or sub-addressing as well). Information that cannot be communicated according to the rules of the basic call procedures is thereby transported call-accompanying with the assistance of the supplementary services. This method would offer the advantage that only the ISDN terminal equipment as well as the network actively control the call setup and the cryptographic equipment must fundamentally intervene in the procedures in only a modifying way.

Since these supplementary services, however, may not be offered internetwork by all network operators under certain circumstances, an additional in-band signalling must be employed at least as a substitute. One skilled in the art would thereby have to proceed in the following manner:

The calling ISDN terminal equipment reaches a specific intermediate status in the call setup;

The calling cryptographic equipment produces the connection to the called cryptographic equipment in the status across the network and communicates the required auxiliary information in-band;

After this, the called cryptographic equipment starts the call setup to the called ISDN terminal equipment and thereby also employs the auxiliary information communicated in-band.

As may be seen, however, the calling ISDN terminal equipment, the called ISDN terminal equipment and the network are not synchronous in this phase with respect to their call status. The ISDN terminal equipment are in various phases of the call setup, whereas the network has already setup the connection between the cryptographic equipment. The basic call procedures at the network interface can thus no longer be utilized for producing the complete call.

SUMMARY OF THE INVENTION

It is an object of the present invention to provide an advantageous and simple possibility of implementing the further, in-band-signalled call setup after the complete synchronization of the entire call.

In general terms the present invention is a method for exchanging information on a per call basis in encrypted or in unencrypted form between ISDN terminal equipment (data terminals, terminals or telecommunication systems) having ISDN standard interfaces without special functions upon employment of basic call procedures. The calling ISDN terminal equipment reaches a specific intermediate call status during the call setup, the calling cryptographic equipment produces the connection to the called cryptographic equipment in this status across the network and communicates a required auxiliary information in-band. Subsequently, the called cryptographic equipment starts the call setup to the called ISDN terminal equipment. The auxiliary information communication in-band is also employed. Following this phase of the call setup wherein the network has already setup the connection between the cryptographic equipment but before the calling ISDN terminal equipment, the called ISDN terminal equipment, and the network are synchronized with respect to their call statuses, the two effected cryptographic equipment control further call setup instead of the network. That is, they emulate the network. The B-channel that already exists is employed for the mutual control, that is, the D-channel procedures at the ISDN equipment interfaces are imaged onto B-channel procedures at the network interfaces upon utilization of an in-band coordination.

There can be up to 2 or up to 30 B-channel connections time-parallel on an ISDN interface dependent on the type, whereby the channel identifier parameter identifies the channel. The corresponding signalling processes are distinguished logically by the parameters of connection and point identifier and call reference. These parameters only have logical relevance at the respective interface, that is, cannot be directly employed for coordination in the B-channel procedures.

For in-band coordination between the signalling processes in the cryptographic equipment, the calling and called cryptographic equipment allocate the B-channel, that is respectively allocated to their network interface, to the later communication of the user information as well as to the transmission of the preceding signalling information between the signalling processes at the side of the ISDN terminal equipment. These signalling processes are defined by the respective parameter pairs at both sides of the network interface.

The method of the present invention has even further aspects.

The in-band emulation is ended when the status "call through-connected end-to-end between the ISDN terminal equipment" has been reached. "Premature clearing" (call clear down before the status is reached) is signalled in the B-channel and is subsequently accomplished by both sides in the D-channel. What signalling procedures are emulated in detail in the B-channel is not the subject matter of the present invention.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 is a block diagram of a prior art arrangement of cryptographic equipment for ISDN telecommunication terminal equipment;

FIG. 2 is a block diagram of another prior art arrangement of cryptographic equipment for ISDN telecommunication terminal equipment;

DESCRIPTION OF THE PREFERRED EMBODIMENT

Figure 3:
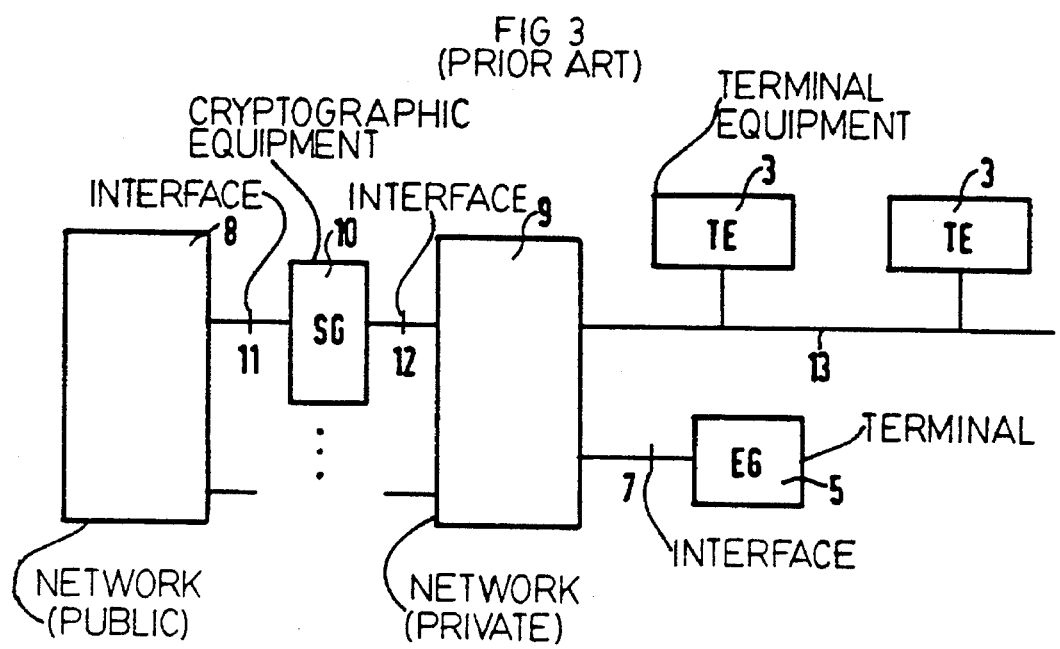
FIG. 3, is a block Diagram of yet another prior art arrangement of cryptographic equipment for ISDN telecommunication terminal equipment.
Figure 4:
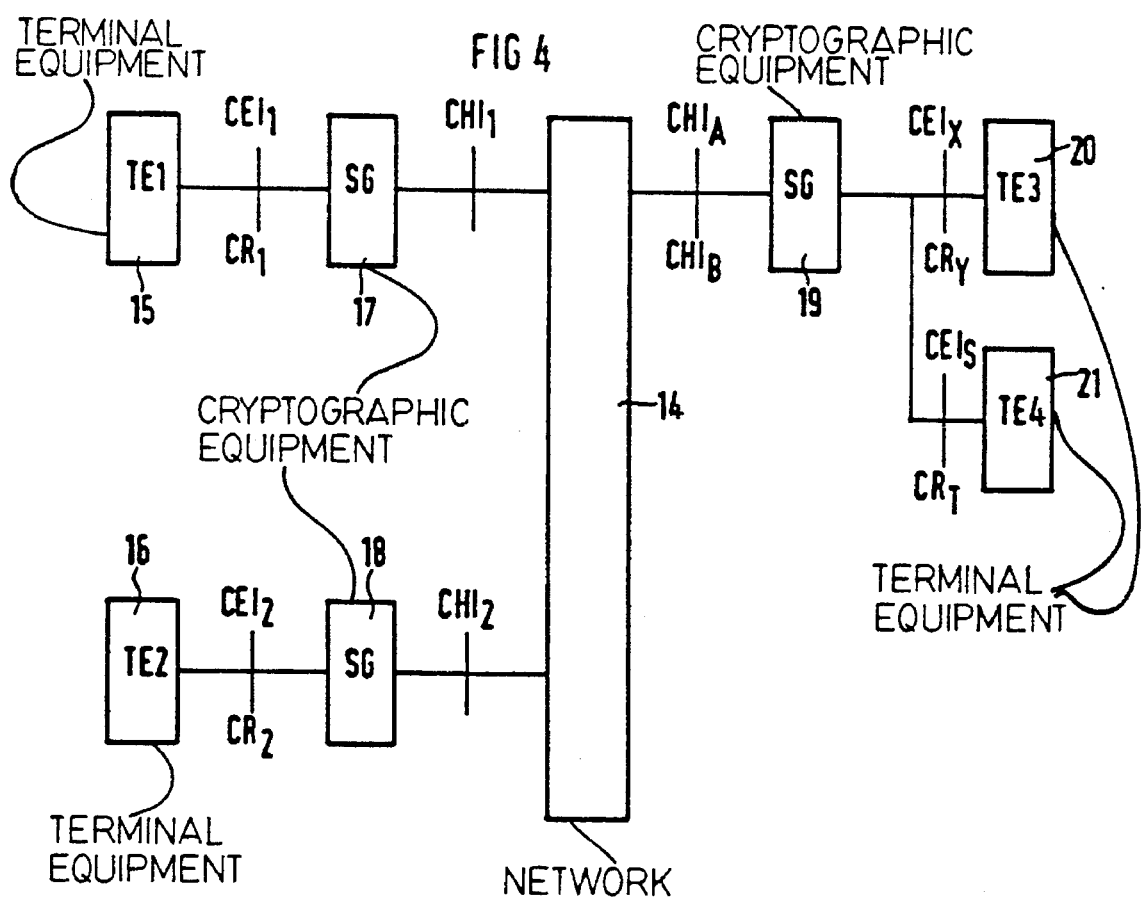
FIG. 4 is a block diagram of an arrangement of cryptographic equipment according to the present invention.

In a block circuit diagram of an exemplary embodiment, FIG. 4 shows the allocation of transport medium to a signalling process according to the method of the present invention. Two ISDN terminal equipment 15, 16 each having a respective cryptographic equipment 17, 18 are present at the one side of a public or private network 14, and a cryptographic equipment 19 lies at the other side of the network 14 in the delivery route to two ISDN terminal equipment 20 and 21. The channel identification parameters at the left-hand side of the network are referenced $CHI_1$ and $CHI_2$. The channel identification parameters at the right-hand side of the network 14 are referenced $CHI_A$ and $CHI_B$ in the single bus. The signalling processes at the left-hand side of the network 14 are referenced $CEI_1$ and $CR_1$ relative to the ISDN terminal equipment 15, and $CEI_2$ and $CR_2$ relative to the ISDN terminal equipment 16. The signalling processes at the right-hand side of the network are distinguished by the parameters $CEI_x$ and $CR_y$ relative to the ISDN terminal equipment 20, and by the parameters $CEI_S$ and $CR_T$ relative to the ISDN terminal equipment 21.

When, for example, connections are to be produced, on the one hand, between the ISDN terminal equipment 15 and 21 and, on the other hand, between the ISDN terminal equipment 16 and 20, then the corresponding parameters read:

$CEI_1/CR_1$-$CHI_1 \leftarrow \rightarrow CHI_A$-$CEI_S/CR_T$ $CEI_2/CR_2$-$CHI_2 \leftarrow \rightarrow CHI_B$-$CEI_C/CR_Y$ This means, for example, that the coordination between the signalling processes $CEI_1/CR_1$ and $CEI_S/CR_T$ ensues via the B-channel that is defined in these processes by CHI, or, respectively, $CHI_A$.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for exchanging information on a per call basis using basic call procedures, whereby cryptographic call statuses are synchronized between ISDN terminal equipment having ISDN standard interfaces without special functions and having associated cryptographic equipment, said ISDN standard interfaces connected to a network via said associated cryptographic equipment, a calling ISDN terminal equipment reaching a specific intermediate call status during a call setup with a called ISDN terminal equipment, and the calling cryptographic equipment of said calling ISDN terminal equipment producing a connection to a called cryptographic equipment of the called ISDN terminal equipment in the intermediate call status across the network and communicating a required auxiliary information, and, subsequently, the called cryptographic equipment initiating a call setup to an associated called ISDN terminal equipment, in-band communicated auxiliary information being also employed in the call setup, comprising the steps of: after said intermediate call status wherein the network has already setup a connection between the calling and called cryptographic equipment, but before the calling ISDN terminal equipment, the called ISDN terminal equipment, and the network are synchronized with one another with respect to call statuses of the calling ISDN terminal equipment, of the called ISDN terminal equipment, and of the network, controlling via said calling cryptographic equipment and said called cryptographic equipment further call setup and thereby emulating the network, whereby an existing B-channel is used for mutual control; executing basic call procedures of the D-channel at the ISDN equipment interfaces of the called and calling ISDN terminal equipment by utilizing the B-channel at network interfaces and using in-band B-channel coordination between signalling processes of the called and calling cryptographic equipment.

2. The method according to claim 1, wherein for in-band B-channel coordination between the signalling processes in the calling and called cryptographic equipment, the calling and called cryptographic equipment allocate a B-channel respectively allocated to their network interface to later communication of user information as well as to transmission of preceding signalling information between signalling processes at one side of the network with the ISDN terminal equipment, said signalling processes being defined by respective parameter pairs at both sides of the network.

3. The method according to claim 1, wherein the control of the call setup by the calling and called cryptographic equipment is ended when a predetermined status has been reached that defines an end-to-end through-connection between the calling and called ISDN terminal equipment.

4. The method according to claim 3, wherein a call cleardown is signalled in the B-channel before said intermediate call status is reached and is subsequently accomplished from both sides of the network in the D-channel.

5. The method according to claim 1, wherein the method further comprises an additionally installed substitute for a supplementary service that is not offered internetwork by all network operators and with whose assistance information, that is not communicable according to rules of the basic call procedures, are transported call-accompanying.

6. A method for exchanging information on a per call basis in encrypted form between ISDN terminal equipment using basic call procedures, said ISDN terminal equipment having associated ISDN standard interfaces, said ISDN standard interfaces connected to a network via cryptographic equipment, a calling ISDN terminal equipment reaching a specific intermediate call status during a call setup with a called ISDN terminal equipment, a calling cryptographic equipment for said calling ISDN terminal equipment establishing a connection to a called cryptographic equipment for said called ISDN terminal equipment in said intermediate call status across the network and communicating in-band auxiliary information, and, subsequently, the called cryptographic equipment initiating a call setup to the called ISDN terminal equipment, comprising the steps of: following an initial call setup, wherein the network has already setup the connection between the calling and called cryptographic equipment but the calling ISDN terminal equipment, the called ISDN terminal equipment, and the network are not yet synchronized to one another, emulating the network via the calling and called cryptographic equipment for mutually controlling further call setup; executing basic call procedures of the D-channel at the ISDN equipment interfaces of the called and calling ISDN terminal equipment by utilizing the B-channel at network interfaces and using in-band B-channel coordination between signalling processes of the called and calling cryptographic equipment.

7. The method according to claim 6, wherein for in-band B-channel coordination between the signalling processes in the calling and called cryptographic equipment, the calling and called cryptographic equipment allocate a B-channel respectively allocated to their network interface to later communication of user information as well as to transmission of preceding signalling information between signalling processes at one side of the network with the ISDN terminal equipment, said signalling processes being defined by respective parameter pairs at both sides of the network.

8. The method according to claim 6, wherein the control of the call setup by the cryptographic equipment is ended when a predetermined status has been reached that defines an end-to-end through-connection between the calling and called ISDN terminal equipment.

9. The method according to claim 8, wherein a call cleardown is signalled in the B-channel before said intermediate call status is reached and is subsequently accomplished from both sides of the network in the D-channel.

10. The method according to claim 6, wherein the method further comprises an additionally installed substitute for a supplementary service that is not offered internetwork by all network operators and with whose assistance information, that is not communicable according to rules of the basic call procedures, are transported call-accompanying.

11. A method for exchanging information on a per call basis of encrypted form between ISDN terminal equipment using basic call procedures, said ISDN terminal equipment having associated ISDN standard interfaces, said ISDN standard interfaces connected to a network via cryptographic equipment, a calling ISDN terminal equipment reaching a specific intermediate call status during a call setup with a called ISDN terminal equipment, a calling cryptographic equipment for said calling ISDN terminal equipment establishing a connection to a called cryptographic equipment for said called ISDN terminal equipment in said intermediate call status across the network and communicating in-band auxiliary information, and, subsequently, the called cryptographic equipment initiating a call setup to the called ISDN terminal equipment, comprising the steps of: following an initial call setup, wherein the network has already setup the connection between the calling and called cryptographic equipment but the calling ISDN terminal equipment, the called ISDN terminal equipment, and the network are not yet synchronized to one another, emulating the network via the calling and called cryptographic equipment for mutually controlling further call setup; executing basic call procedures of the D-channel at the ISDN equipment interfaces of the called and calling ISDN terminal equipment by utilizing the B-channel at network interfaces and using in-band B-channel coordination between signalling processes of the called and calling cryptographic equipment, the existing B-channel being respectively allocated for later communication of user information as well as for transmission of preceding signalling information between signalling processes of the calling and called ISDN terminal equipment, said signalling processes being defined by respective parameter pairs at both sides of the network, the respective parameter pairs being a connection end point identifier and a call reference.

12. The method according to claim 11, wherein the control of the call setup by the calling and called cryptographic equipment is ended when a predetermined status has been reached that defines an end-to-end through connection between the calling and called ISDN terminal equipment.

13. The method according to claim 12, wherein a call cleardown is signalled in the B-channel before said intermediate call status is reached and is subsequently accomplished from both sides of the network in the D-channel.

14. The method according to claim 11, wherein the method further comprises an additionally installed substitute for a supplementary service that is not offered internetwork by all network operators and with whose assistance information, that is not communicable according to rules of the basic call procedures, are transported call-accompanying.

* * * * *